United States Patent
Lee et al.

(10) Patent No.: US 6,515,677 B1
(45) Date of Patent: Feb. 4, 2003

(54) BORDER DISPLAY DEVICE

(75) Inventors: In Ho Lee, Seoul (KR); Dong Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/475,130

(22) Filed: Dec. 30, 1999

(30) Foreign Application Priority Data

Dec. 31, 1998 (KR) .............................................. 98-62821

(51) Int. Cl.[7] .................................................. G09G 5/14
(52) U.S. Cl. ........................................ 345/634; 348/588
(58) Field of Search ................................. 345/634, 640, 345/641, 426; 348/588, 597

(56) References Cited

U.S. PATENT DOCUMENTS

| | | | | |
|---|---|---|---|---|
| 4,392,156 A | * | 7/1983 | Duca et al. .................. | 348/597 |
| 5,388,202 A | * | 2/1995 | Squires et al. ............... | 345/782 |
| 5,452,406 A | * | 9/1995 | Butler et al. ................. | 345/426 |
| 5,978,044 A | * | 11/1999 | Choi ........................... | 348/578 |

* cited by examiner

Primary Examiner—Jeffery Brier
(74) Attorney, Agent, or Firm—Birch, Stewart, Kolasch & Birch, LLP (57) ABSTRACT

A PIP border display device allows a viewer to control the appearance of a border by color, shading and shape. Particularly, the border is divided into a plurality of regions, and different shadings or colors are applied to the plurality of regions according to a viewer's preference.

15 Claims, 7 Drawing Sheets

FIG.8A (progressing scanning)

FIG.8B (interlaced scanning)

BORDER DISPLAY DEVICE

BACKGROUND OF THE INVENTION

1. Field of the Invention

The present invention relates to display devices, and more particularly to a border display device for simultaneously displaying a plurality of images on a display device.

2. Discussion of Related Art

Recently, voluminous amounts of visual information are transmitted through broadcasting channels. Moreover, the number of broadcasting channels continues to rise with more and more industries developing to meet the demands of viewers asking for a variety of information. In this multi-channel era, a picture in picture (PIP) technique is used to preview or search different channels while viewing another channel. Also, the possible range of a PIP use may be further extended in the future. This PIP technique uses a border for dividing and display of plural channels or images.

Figure 1:
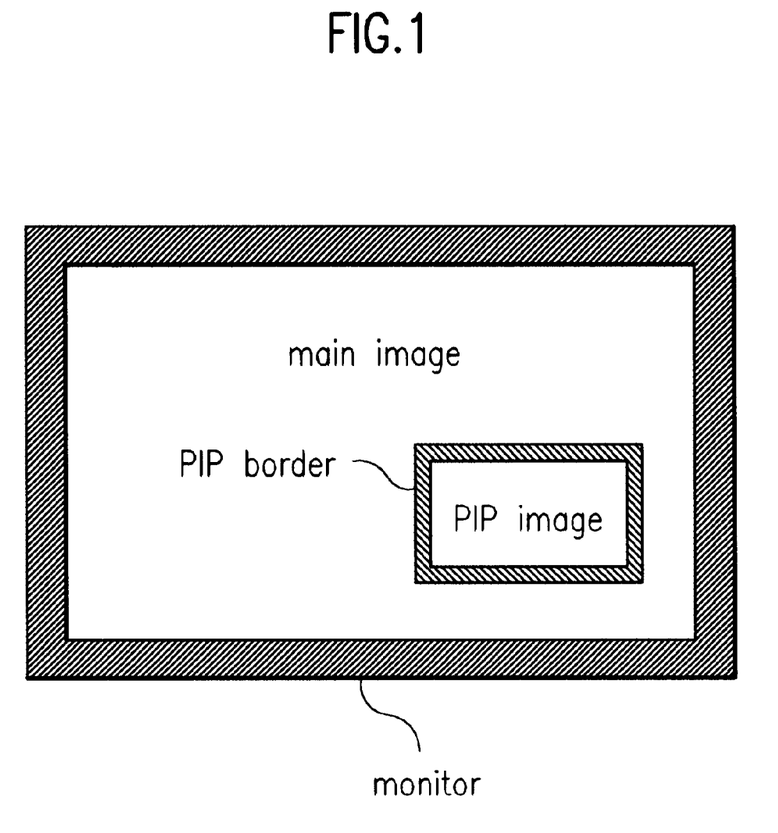
FIG. 1 shows a PIP picture displayed with a main image according to a border technique in the related art.
Figure 2:
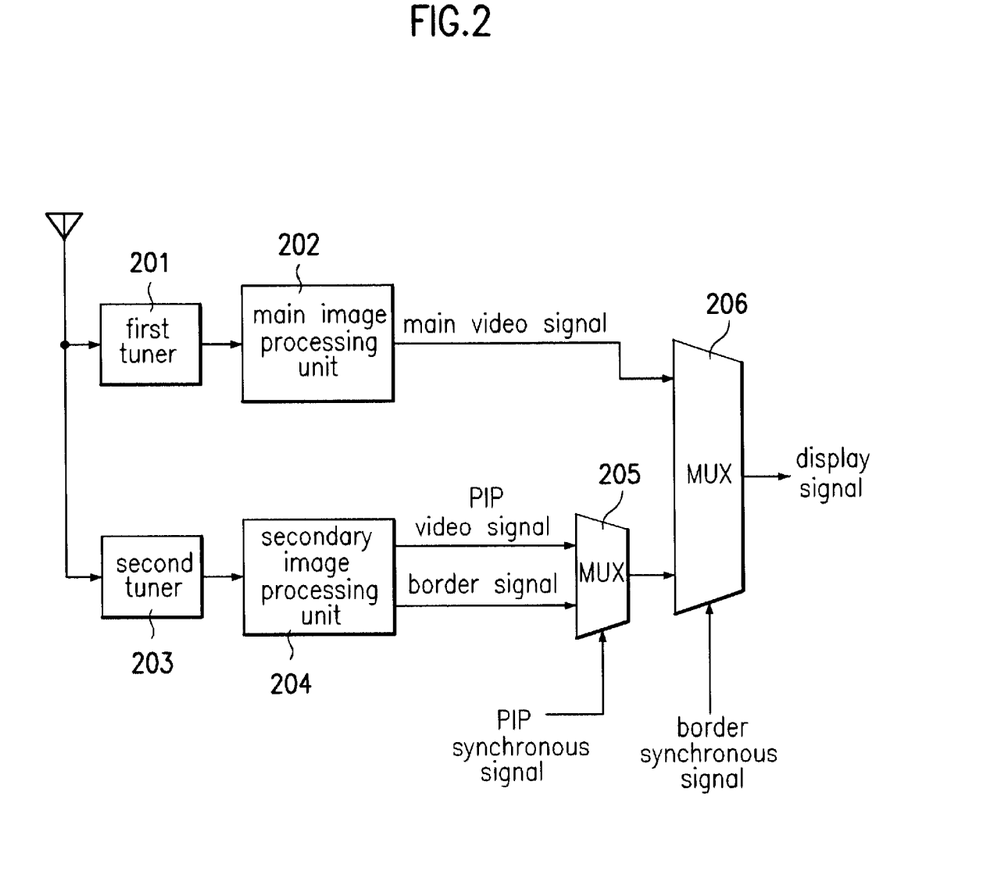
FIG. 2 is a block diagram of a receiving system in the related art including a border display device.

FIG. 1 shows a PIP border generated by a PIP technique in the related art. As seen, a typical PIP border is a mono-color of black or gray. Such PIP technique is used for both dynamic pictures and pictures in which a color or shading may rapidly change. FIG. 2 is a block diagram of a receiving system in the related art for displaying a PIP screen.

Referring to FIG. 2, a first tuner 201 selects a channel for a main image through an antenna and sends the selected channel to a main image processing unit 202. A second tuner 203 selects a channel for a secondary image also through the antenna and sends the selected channel to a secondary image processing unit 204. If the receiving system is a digital system and various programs are multiplexed in one channel, a single tuner can select and respectively output the selected channels for the main and secondary image.

The main image processing unit 202 decodes a main image signal to form a main picture and sends the main picture to a second multiplexer 206. If the secondary image is a PIP, the secondary image processing unit 204 performs down sampling in accordance with the PIP screen, and produces a PIP video signal and a PIP border signal.

A first multiplexer 205 multiplexes the PIP video signal and the PIP border signal using a synchronous signal of the PIP screen as a selecting signal, and sends the multiplexed PIP signal to the second multiplexer 206. Accordingly, the first multiplexer 205 outputs a PIP picture including a PIP border. The second multiplexer 206 multiplexes a main video signal from the main image processing unit 202 and a PIP signal from the first multiplexer 205, by using a synchronous signal related to the PIP border, and outputs the result to a display device, such as a monitor. Therefore, a main picture and a PIP-picture including a PIP border are simultaneously displayed on a display device.

However, in the conventional border display device, distinguishing the border between a main picture and a PIP picture may sometimes be difficult. This is apparent especially when a color around a PIP picture or shading of a main picture is similar to a color or shading of the PIP border. In addition, the PIP border may be visually too simple to meet the demands and tastes of viewers.

SUMMARY OF THE INVENTION

Accordingly, an object of the present invention is to solve at least the problems and disadvantages of the related art.

An object of the present invention is to provide a border display device capable of variously displaying a border to divide a plurality of images displayed on a screen.

Another object of the present invention is to provide a border display device that divides a border into a plurality of parts. More particularly, the object of the present invention is to give viewers a 3-dimensional (3D) or a cubic effect.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a border display device includes a shade processing unit converting a brightness and a difference of shade in a border in response to the border's current brightness; an adder adding the border's brightness and the shade difference produced through the shade processing unit; and a selector selectively outputting either the border's brightness generated through the shading processing unit or the sum output by the adder, in response to a selection signal. A brightness of the border is a brightness included in the color signal of the border.

The shade processing unit includes a comparator comparing the border's brightness with a preset threshold; and an operating unit outputting the border's brightness and shade difference as received or converting and outputting the border's brightness and shade difference, in response to the comparator's output.

In the present invention, the border's color and shading difference can be selected by a user. Furthermore, the border display device of the present invention may include a selection control unit producing a selection signal according to an area division from a width of the border and a synchronous signal of a border to be displayed, and sending the selection signal to the selector. The border's width can also be selected by a user.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Generally, the present invention creates a visual effect to a border that divides channels or pictures when simultaneously viewing different channels on a monitor which supports a PIP function, a digital TV field or a multi-PIP. Particularly, a user can control the width of a PIP border according to the user's preference and create a 3D or cubic effect by dividing the PIP border and differently shading the divided sections of the border.

An effective way of shading a PIP border is by manipulating the YUV space (Y brightness; UV color). Thus, in the present invention, the shading may easily be implemented by changing the value of brightness Y. A preferred embodiment of a border according to the present invention is divided into a plurality of regions, wherein different shadings are applied to the regions of the border. Hereinafter, a current brightness setting of first regions of the border will be referred as a brightness Y and a desired different of the brightness in second regions will be referred as a shade difference diff_Y.

Figure 3:
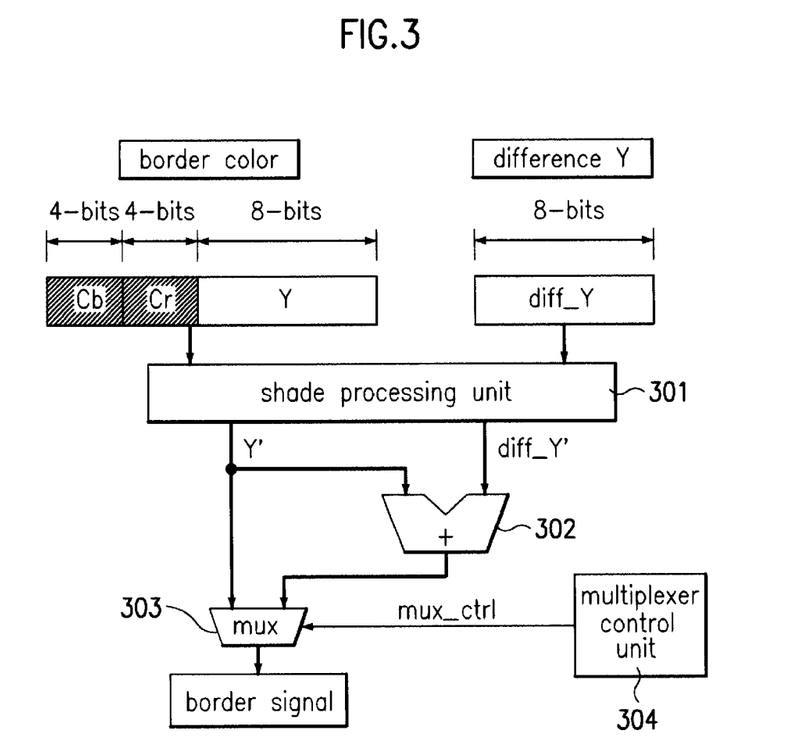
FIG. 3 is a block diagram of a border display device in accordance with the present invention.

FIG. 3 is a block diagram of a border display device according to the present invention including a shade processing unit 301 which respectively converts a brightness signal Y into a new brightness signal Y' and a shade difference value Y into a new shade difference value diff_Y', in response to a saturation condition of the brightness signal Y; an adder 302 which adds the brightness signal Y' and the shade difference value diff_Y' output by the shade processing unit 301; a multiplexer 303 which selectively outputs the brightness Y' or the sum from the adder 302; and a multiplexer control unit 304 which outputs a selection signal to the multiplexer 303.

In the border display device, the computation necessary for coloring of the PIP border is executed in the YUV space. Also, the value of the brightness Y is more important than the color. Thus, eight bits are used for the brightness value Y and eight bits are used for the shade difference diff_Y while the most significant four bits are used for the color component. Moreover, the color or the shading difference value diff_Y may be downloaded from a host allowing a user to select a particular color or shade according to the user's preference.

Figure 4:
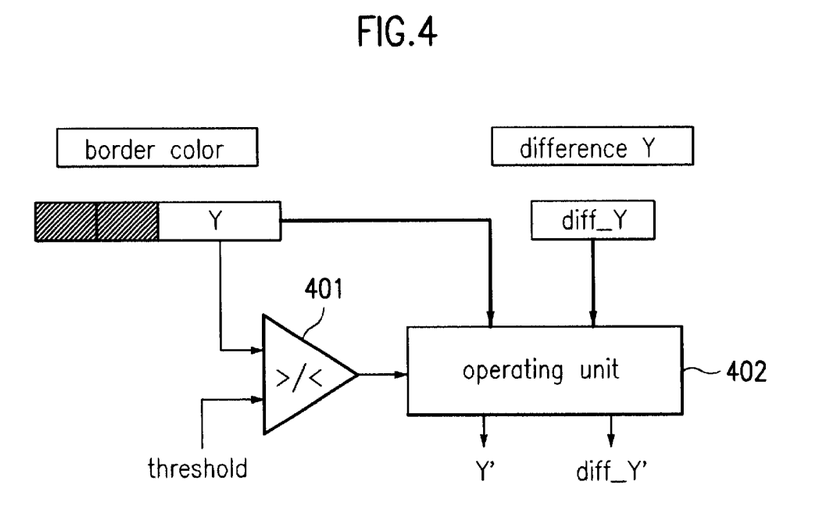
FIG. 4 is a block diagram of a shade processing unit of FIG. 3.

FIG. 4 is a block diagram of the shade processing unit 301 including a comparator 401 which compares a current brightness Y of the border with a preset threshold, and an operating unit 402 which converts the brightness Y and the shade difference diff_Y in response to the output of the comparator 401.

The shade processing unit 301 converts the brightness Y and the shade difference diff_Y of the border into a new value if the brightness of the brightness difference of the border is too large. This is to prevent the brightness of a border region from being saturated when the brightness Y is added to an input shade difference value diff_Y. If the brightness of the border is saturated, the border may change to an undesirable brightness. For example, in a border divided into a plurality of regions, a region to be brightened by a shade difference value diff_Y may appear darker than the original brightness due to a saturation.

Therefore, the comparator 401 compares the brightness Y with a preset threshold to determine whether the brightness of the border would be saturated. If the output of the comparator 401 indicates that the brightness of the border would be saturated, the operating unit 402 outputs the brightness Y as a new shade difference diff_Y', and outputs a difference between the brightness Y and the shade difference diff_Y as a new brightness Y'. The difference between the brightness Y and diff_Y may be obtained, for example, by subtracting the diff_Y from the brightness Y. If the output of the comparator 401 indicates that the brightness would not be saturated, the operating unit 402 outputs the received values without any conversion. Namely, the brightness Y of the border becomes the new border's brightness Y' and the shade difference diff_Y becomes the new shade difference diff_Y'.

Assuming that the brightness signal of the present invention is 8 bits, the threshold would be set to a value of 255, i.e. the added sum of the border's brightness Y and the shade difference diff_Y is considered saturated if the sum exceeds 255. For example, if the border's brightness Y is 240 and the shade difference diff_Y is 100, the output of the adder 302 would be 340 and the comparison of the sum to the threshold, i.e. 255, would show saturation. Accordingly, the operating unit 402 would output a value of 100, the original shade difference, as the new border's brightness Y' and a value of 140 as the new shade difference diff_Y'. Thus, brightness of the two border units are exchanged.

Also, the present border device includes the multiplexer control unit 304 which can control a width and shape of the PIP border to meet a user's preference.

Figure 5:
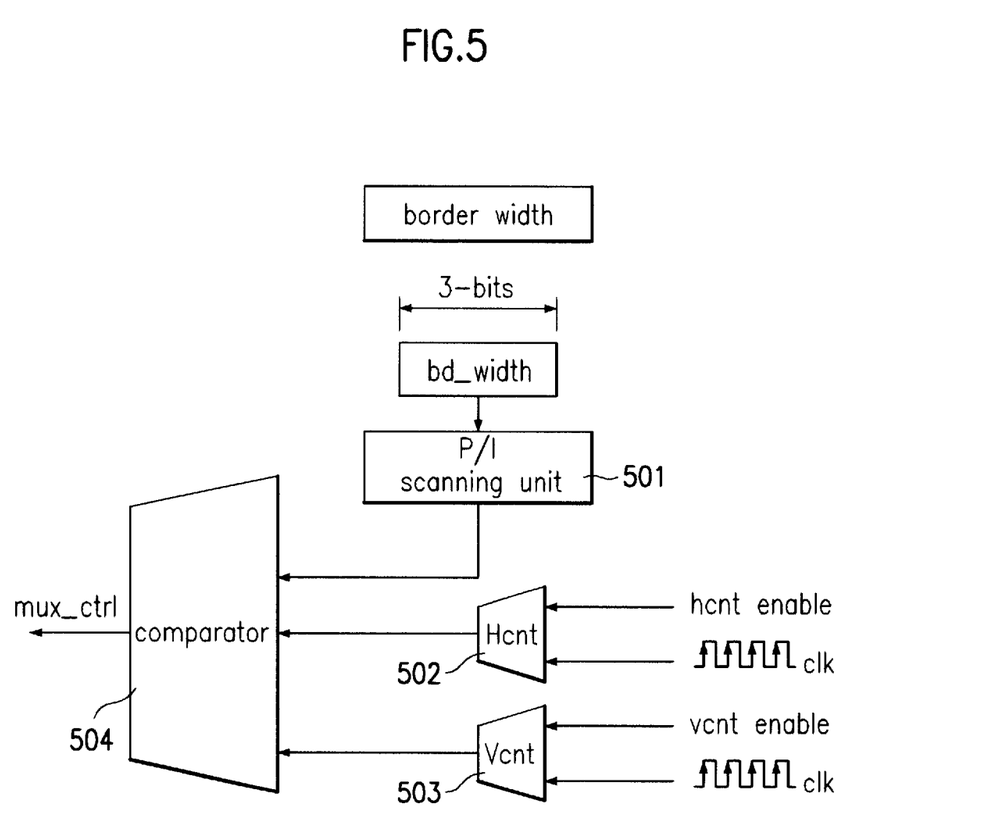
FIG. 5 is a block diagram of a multiplexer control unit of FIG. 3.

FIG. 5 is a block diagram of the multiplexer control unit 304 including a progressive/interlaced (P/I) scanning unit 501 which controls a border width (bd_width) value of a PIP border according to a scanning method after determining the border width value bd_width; a first counter 502 which is reset to the PIP border's horizontal synchronous signal (Hcnt enable) and which counts clocks according to the Hcnt enable; a second counter 503 which is reset to the PIP border's vertical synchronous signal (Vcnt enable) and which counts clocks according to the Vcnt enable; and a comparator 504 which outputs to the multiplexer 303 a selection signal based upon the outputs of the P/I scanning unit 501, the first and second counters 502 and 503.

The border width value bd_width in FIG. 5 is a value that can be downloaded from a host similarly to the border's color, and a user can select the value. The signals Hcnt enable and Vcnt enable respectively input to the first counter 502 and the second counter 503 are each the PIP border's horizontal and vertical synchronous signals. Thus, when a border is divided into a plurality of regions, the comparator 504 outputs an appropriate selection signal to differently shade the regions by counting the pixels of the border using the Hcnt enable and the Vcnt enable.

Particularly, appearance such as the width and shading of the border can be changed depending on the selection signals output by the comparator 504. The comparator 504 can design variety of borders by processing the border width value bd_width with the Hcnt enable and Vcnt enable signals respectively output by the first and second counters 502 and 503. Although the border may be generated to have a variety of different shapes such as a rectangular shape, a circular shape or a triangular shape, a non-rectangular shape requires a much more complex processing by a border display device.

Figure 6:
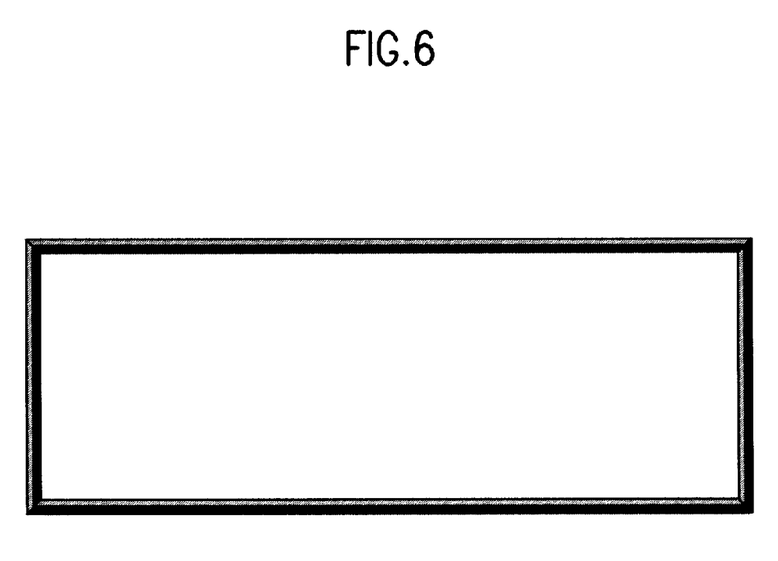
FIG. 6 shows an example of a border according to the present invention.

Accordingly, FIG. 6 shows a preferred embodiment of a border option according to the present invention. Referring to FIG. 6, the border is of a rectangular shape and is divided into a plurality of regions, wherein different shadings are applied to the regions to create a cubic effect. In such case, the new shade difference value diff_Y' output by the shade processing unit 301 allows a display of the border in two shades. Namely, some regions of the border would have a brightness of new brightness Y' and the remaining regions would have a brightness equivalent to the sum of the brightness Y' and shade difference diff_Y'. To apply the appropriate shading to the regions, the horizontal and vertical pixels of the border may be counted utilizing the first and second counters 502 and 503.

For example, a border width value bd_width of '0' means that the PIP border is not displayed, and if a new shade difference value diff_Y' of FIG. 4 is '0', there would be no division of the border by different shading. Thus, the border according to the present invention can be displayed by a simple monocolor as in the related art. Also, rather than applying different shading to regions of a divided border, different colors may be applied. The border options may be downloaded from a host allowing a user to select a particular color or shading for regions according to the user's preference. As a result, the main picture and the PIP picture can be better distinguished than the monocolor PIP border of the related art.

Figure 7A:
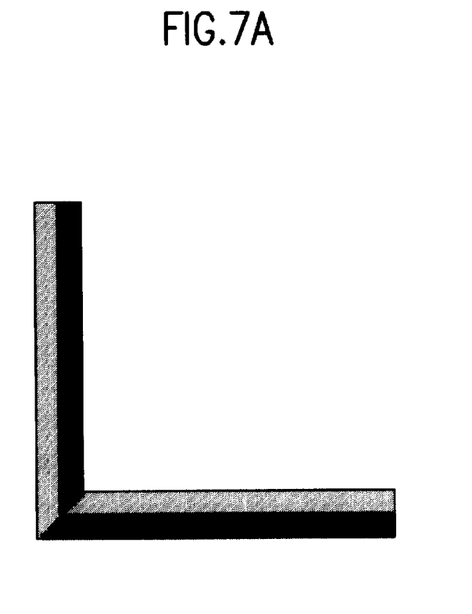
FIGS. 7A and 7B each show an enlarged right upper and left lower ends of the border in FIG. 6.
Figure 7B:
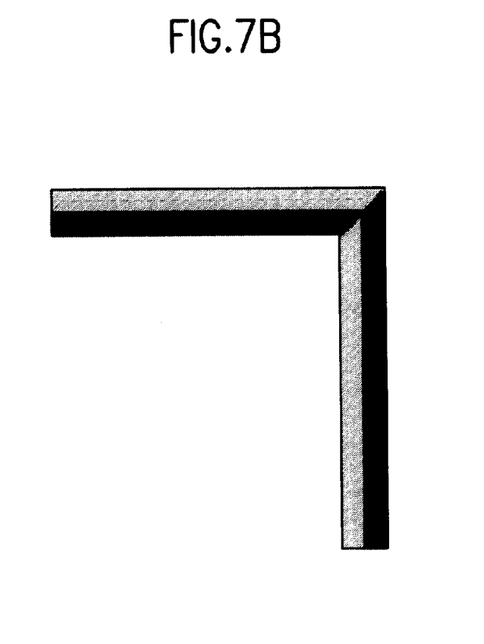

FIGS. 7A and 7B respectively show an enlarged right upper end and an enlarged left lower end of the border in FIG. 6. As the difference in shading of the regions become more pronounced, the greater is the contrast among the region, thereby providing clearer picture distinctions. However, if the contrast is too large, it may be offensive to the eye. Therefore, as an alternative, different colors may be utilized for the different regions of the border rather than shading. As a result, even a plurality of dynamic images may be easily distinguished by a viewer.

Figure 8A:
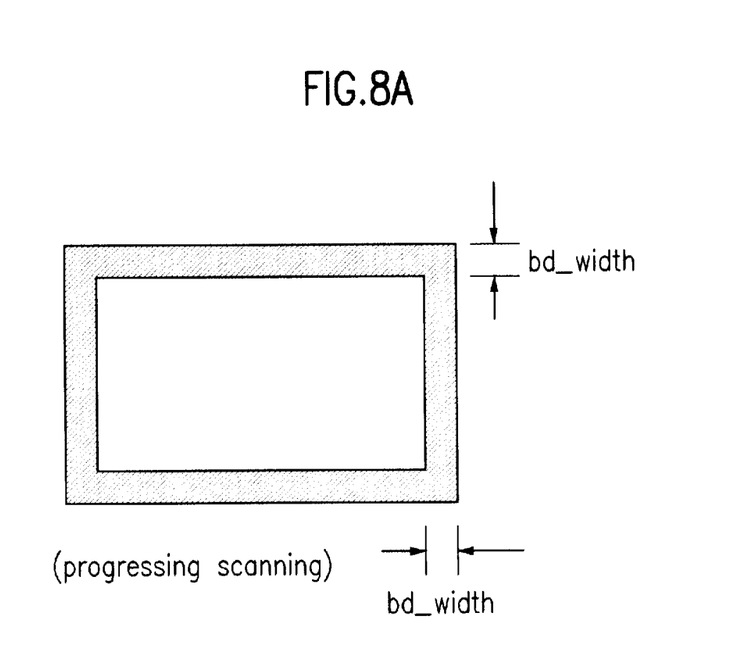
FIGS. 8A and 8B each shows a variation of a border's width in accordance with a progressive scanning and an interlaced scanning.
Figure 8B:
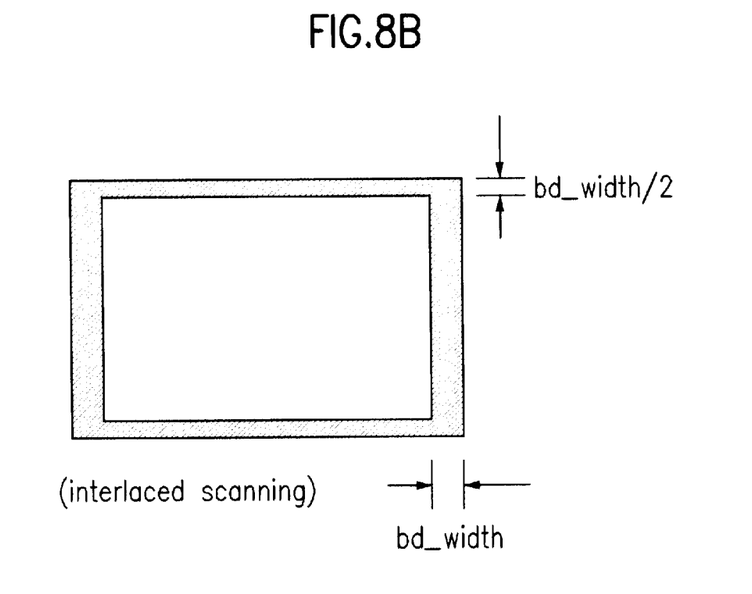

Moreover, the P/I scanning unit 501 varies the determined border width bd_width based upon the scanning method (progressive or interlaced scanning). For example, if a user prefers a border thickness of 8 pixels, the border width value bd_width becomes 9 for the progressive scanning method, as shown in FIG. 8A. However, for the interlaced scanning method, the longitudinal border width value bd_width becomes 9 while the transverse border width value bd_width becomes 4, as shown in FIG. 8B. Since the even-line and odd-line fields are alternately displayed by the interlaced scanning method, the transverse border's value is about one-half of the longitudinal border's value.

The PIP border display device according to the present invention provides a better visual effect by additional hardware to a conventional display device. By the additions, image distinctions can readily be made by a viewer when various images coexist on a screen. In addition, a user can control the appearance such as the width or shading of a PIP border according to the user's preference. Accordingly, in the multimedia era where the ASIC technology is being rapidly developed and the visual aspect becomes one of the most important element, the present invention can enhance the display effect in real time processing of images.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A picture in picture (PIP) border display device comprising:
   a shade processing unit which converts a brightness value Y of a PIP border and a shade difference value diff_Y of the PIP border, based upon the brightness value Y, and outputs a brightness Y' and a shade difference diff_Y';
   an adder which adds the brightness Y' and the shade difference diff_Y', and outputs a sum; and
   a selecting unit which selectively outputs one of either the brightness Y' or the sum in response to a selection signal.

2. A PIP border display device of claim 1, wherein the shade processing unit comprises:
   a comparator which compares the brightness value Y with a preset threshold; and
   an operating unit which converts the brightness value Y and the shade difference value diff_Y, based upon a result of the comparison, and outputs the brightness value Y' and shade difference value diff_Y'.

3. A PIP border display device of claim 2, wherein the operating unit converts and outputs the brightness value Y as the shade difference value diff_Y' and a difference between the brightness value Y and the shade difference diff_Y as the brightness value Y', if the result of the comparison indicates that the PIP border's brightness would be saturated.

4. A PIP border display device of claim 1, further comprising a selection control unit which outputs the selection signal according to a width value of the PIP border and synchronous signals of the PIP border.

5. A PIP border display device of claim 4, wherein the selection control unit comprises:
   a progressive/interlaced (P/I) scanning unit which controls the width value of the PIP border according to a scanning method;
   a first counter which is reset to a PIP border's horizontal synchronous signal Hcnt and which counts clocks according to a Hcnt enable;
   a second counter which is reset to a PIP border's vertical synchronous signal Vcnt and which counts clocks according to a Vcnt enable; and
   a comparator which outputs the selection signal based upon the outputs of the P/I scanning unit, the first counter and the second counter.

6. A PIP border display device of claim 5, wherein the width of a PIP border's transverse line is reduced by half if the scanning method is an interlaced scanning.

7. A PIP border display device of claim 5, wherein the comparator outputs a selection signal to output the brightness Y' during a first region of the PIP border and outputs a selection signal to output the sum during a second region of the PIP border, wherein the first and second regions of the PIP border are determined by the first and second counters.

8. A PIP border display device of claim 4, wherein the width value of the PIP border is selected by a user.

9. A PIP border display device of claim 1, wherein the brightness value Y is a brightness included in a color signal of the PIP border.

10. A PIP border display device of claim 1, wherein a color of the PIP border and the shade difference value diff_Y are selected by a user.

11. A method for generating a picture in picture (PIP) border, the method comprising:
   (a) converting a brightness value Y of a the PIP border and a shade difference value diff_Y of the PIP border, based upon the brightness value Y, and outputting a brightness Y' and a shade difference diff_Y';
   (b) adding the brightness Y' and the shade difference diff_Y', and outputting a sum; and
   (c) selectively outputting one of either the brightness Y' or the sum in response to a selection signal.

12. A method of claim 11, wherein (a) comprises converting and outputting the brightness value Y as the shade difference value diff_Y' and a difference between the brightness value Y and the shade difference diff_Y as the brightness value Y', if the brightness of Y indicates that the PIP border's brightness would be saturated.

13. A method of claim 11, further comprising the step of generating the selection signal which comprises:
controlling a width value of the PIP border according to a scanning method;
resetting a first clock to a PIP border's horizontal synchronous signal Hcnt and counting clocks according to a Hcnt enable;
resetting a second counter to a PIP border's vertical synchronous signal Vcnt and counting clocks according to a Vcnt enable; and
outputting the selection signal based upon the controlled width value and counted clocks.

14. A method of claim 13, further comprising the step of reducing the width of the PIP border's transverse line by half if the scanning method is an interlaced scanning.

15. A method of claim 13, further comprising the steps of outputting a selection signal to output the brightness Y' during a first region of the PIP border and outputting a selection signal to output the sum during a second region of the PIP border, wherein the first and second regions of the PIP border are determined by the counted clocks.

* * * * *